US012651461B2

(12) United States Patent
Lloyd et al.

(10) Patent No.: US 12,651,461 B2
(45) Date of Patent: Jun. 9, 2026

(54) INTERMITTENT VIDEO DETECTION SYSTEM

(71) Applicant: The Boeing Company, Arlington, VA (US)

(72) Inventors: Charles J. Lloyd, Snohomish, WA (US); Eric J. Harvey, Mill Creek, WA (US); Jessica R. Columbus, Arlington, WA (US)

(73) Assignee: The Boeing Company, Arlington, VA (US)

( * ) Notice: Subject to any disclaimer, the term of this patent is extended or adjusted under 35 U.S.C. 154(b) by 136 days.

(21) Appl. No.: 18/659,662

(22) Filed: May 9, 2024

(65) Prior Publication Data

US 2026/0030895 A1     Jan. 29, 2026

(51) Int. Cl.
*G06V 20/56* (2022.01)
*H04N 5/265* (2006.01)

(52) U.S. Cl.
CPC ............. *G06V 20/56* (2022.01); *H04N 5/265* (2013.01)

(58) Field of Classification Search
CPC ............................... H04N 5/265; G06V 20/56

USPC .......................................................... 348/148
See application file for complete search history.

(56) References Cited

U.S. PATENT DOCUMENTS

| | | | |
|---|---|---|---|
| 9,022,291 B1 * | 5/2015 | van der Merwe | H04N 1/32149 235/469 |
| 9,024,966 B2 * | 5/2015 | Meulen | H04N 9/75 345/589 |
| 2011/0147529 A1 * | 6/2011 | Adarve Lozano | B64D 39/00 244/135 A |

* cited by examiner

*Primary Examiner* — John W Miller
*Assistant Examiner* — Omer Khalid
(74) *Attorney, Agent, or Firm* — Yee & Associates, P.C.

(57) ABSTRACT

A video system comprises a video overlay processor. The video overlay processor is configured to receive a video stream from a camera system in real time during operation of a platform. The video overlay processor is configured to overlay a first pattern and a second pattern on an alternating and repeating basis onto frames sequentially in the video stream in real time to form a modified video stream. The video overlay processor is configured to display the modified video stream in real time on a display system, wherein the first pattern and the second pattern in the frames in the modified video stream are perceptually hidden on the display system in response to the frames in the modified video stream being displayed without interruption.

25 Claims, 12 Drawing Sheets

1200

1202 — SPECIFICATION AND DESIGN

1204 — MATERIAL PROCUREMENT

1206 — COMPONENT AND SUBASSEMBLY MANUFACTURING

1208 — SYSTEM INTEGRATION

1210 — CERTIFICATION AND DELIVERY

1212 — IN SERVICE

1214 — MAINTENANCE AND SERVICE

1300

AIRCRAFT

1302 — AIRFRAME     INTERIOR — 1306

SYSTEMS

PROPULSION SYSTEM

ELECTRICAL SYSTEM 1308   1312

1310   1314

HYDRAULIC SYSTEM

ENVIRONMENTAL SYSTEM

1304

INTERMITTENT VIDEO DETECTION SYSTEM

BACKGROUND INFORMATION

1. Field

The present disclosure relates generally to the detection of permanently unstable video in addition to temporally unstable video displayed to a human observer and in particular, to managing refueling of aircraft.

2. Background

Refueling aircraft during flight can extend the range and mission capabilities of aircraft without requiring the aircraft to land to receive fuel. This type of refueling is also referred to as aerial refueling or in-flight refueling. With this type of operation, tanker aircraft can transfer fuel to an aircraft. This aircraft receiving the fuel is referred to as a receiver aircraft.

With this type of refueling, a refueling boom is used to transfer fuel from the tanker aircraft to the receiver aircraft. The refueling boom is a rigid and pivoting telescopic tube that extends from the tanker aircraft. The connection to the receiver aircraft is made by connecting the tanker boom to a receiver receptacle or probe on the receiver aircraft.

The aerial refueling operator of a tanker aircraft, equipped with a vision system, uses a camera and display subsystems to guide the boom into the receptacle of the receiver aircraft. The aerial refueling operator relies on the video received from the camera system to visualize the distance between the boom and receiver aircraft to safely perform a refueling operation.

SUMMARY

An embodiment of the present disclosure provides a tanker aircraft vision system comprising a camera system, a display system, and a video overlay processor. The camera system on the tanker aircraft generates a video stream of relative positions between a boom and a receiver aircraft. The display system is located in the tanker aircraft. The video overlay processor is located in the tanker aircraft and is configured to receive the video stream from the camera system in real time during operation of the tanker aircraft. The video display processor is configured to overlay a first pattern and a second pattern on an alternating and repeating basis onto frames sequentially in the video stream in real time to form a modified video stream. The video display processor is configured to display the modified video stream in real time on the display system. The first pattern and the second pattern in the frames in the modified video stream are perpetually hidden on the display system in response to the frames in the modified video stream.

Another embodiment of the present disclosure provides a video system comprising a video overlay processor. The video overlay processor is configured to receive a video stream from a camera system in real time during operation of a platform. The video overlay processor is configured to overlay a first pattern and a second pattern on an alternating and repeating basis onto frames sequentially in the video stream in real time to form a modified video stream. The video overlay processor is configured to display the modified video stream in real time on a display system. The first pattern and the second pattern in the frames in the modified video stream are perceptually hidden on the display system in response to the frames in the modified video stream being displayed without interruption.

Yet another embodiment of the present disclosure provides a method for displaying a video stream. The video stream is received from a camera system in real time. The first pattern and a second pattern are overlaid on an alternating and repeating basis onto frames sequentially in the video stream to form a modified video stream in real time. The modified video stream is displayed on the display system in real time. The first pattern and the second pattern in the frames in the modified video stream are perceptually hidden on the display system in response to the frames in the modified video stream being displayed without interruption.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described herein. For example, when conducting boom refueling using modern tanker aircraft the aerial refueling operator (ARO) is completely reliant on the use of a video system to observe the relative positions of the boom and the receiver aircraft. If the video system generates errors or inconsistencies in the video or fails during the refueling operation, the aerial refueling operator immediately informs the pilot in the receiver aircraft to move away from the tanker and the boom. Moving quickly in response to a video failure can reduce the risk of an unintended impact between the boom and the receiver aircraft. Without quick action, an unintended impact between the boom and the receiver aircraft can occur resulting in loss of aircraft and/or undesired events.

Therefore, it would be desirable to have a method, apparatus, system, and computer program product that take into account at least some of the issues discussed above, as well as other possible issues. For example, it would be desirable to have a method and apparatus that overcome an inability to receive and display a reliable repeating series of sequential video frames from the camera system.

The illustrative examples provide a method, apparatus, system, and computer program product for managing refueling of an aircraft. In one illustrative example, stopped or intermittent video can be detected by the aerial refueling operator. For example, a pair of patterns can be created and injected into the video as the video is displayed. The patterns are designed to be visible when the display of the video frames are not sequential or at a sufficient rate causing a single pattern to be displayed for a duration of multiple frames, making it visible. The pair of patterns are patterns selected that cancel each other when viewed in rapid succession by a human observer.

For example, the color of the video can be shifted towards the red on odd frames and towards green on even frames. The display of such frames to a human observer are perceived as a neutral average of the red and green color shifts. With the relatively slow response of human color vision, the aerial refueling operator user would not detect the transient color shifts unless a single pattern is displayed for more than a given period of time.

Figure 1:
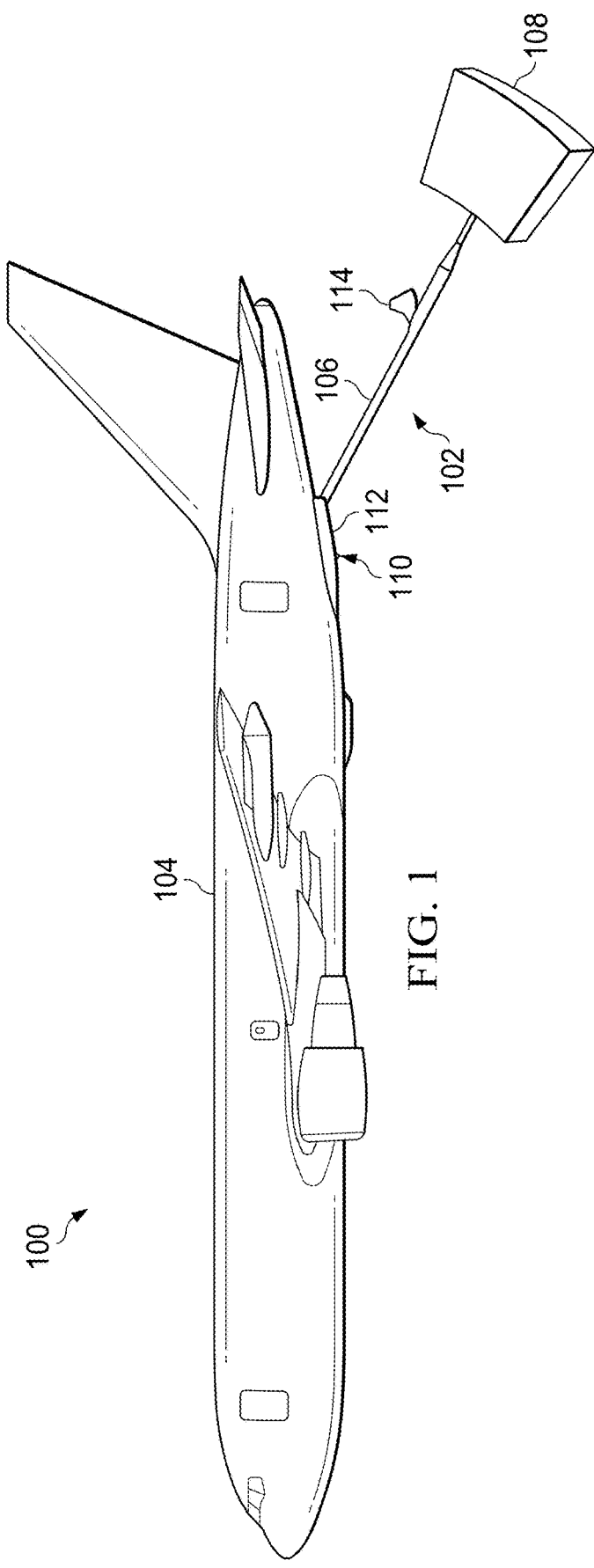
FIG. 1 is an illustration of a tanker aircraft in accordance with an illustrative embodiment.

With reference now to the figures and, in particular, with reference to FIG. 1, an illustration of a tanker aircraft is depicted in accordance with an illustrative embodiment. In this example, tanker aircraft 100 is an example of a refueling aircraft that can be used to refuel a receiver aircraft midair during flight. As depicted, refueling system 102 is mounted on fuselage 104 of tanker aircraft 100.

Refueling system 102 includes a number of different components. As depicted in this view of tanker aircraft 100, refueling system 102 comprises boom 106 and camera system 110.

Boom 106 is a rigid and pivoting telescoping pipe that extends from bottom side 112 of fuselage 104 at the rear of tanker aircraft 100. In this example, bottom side 112 is a side of fuselage 104 that faces downward during normal operation of tanker aircraft 100.

Drogue 108 is located at the end of boom 106 that can make contact with a probe on the receiver aircraft. Control surfaces 114 on boom 106 can stabilize and control the movement of boom 106. In this example, control surfaces 114 comprise fins that can have flaps.

Camera system 110 generates a video stream that is sent to a display system within tanker aircraft 100 for use by a refueling operator. In this example, camera system 110 captures images and generates a video stream using the captured images. In this example, camera system 110 generates a video stream of boom 106 and a receiver aircraft.

In this illustrative example, the aerial refueling operator can control movement of boom 106. This control of boom 106 can align drogue 108 with a probe on the receiver aircraft such that drogue 108 receives the probe and transfers fuel to the receiver aircraft.

Figure 2:
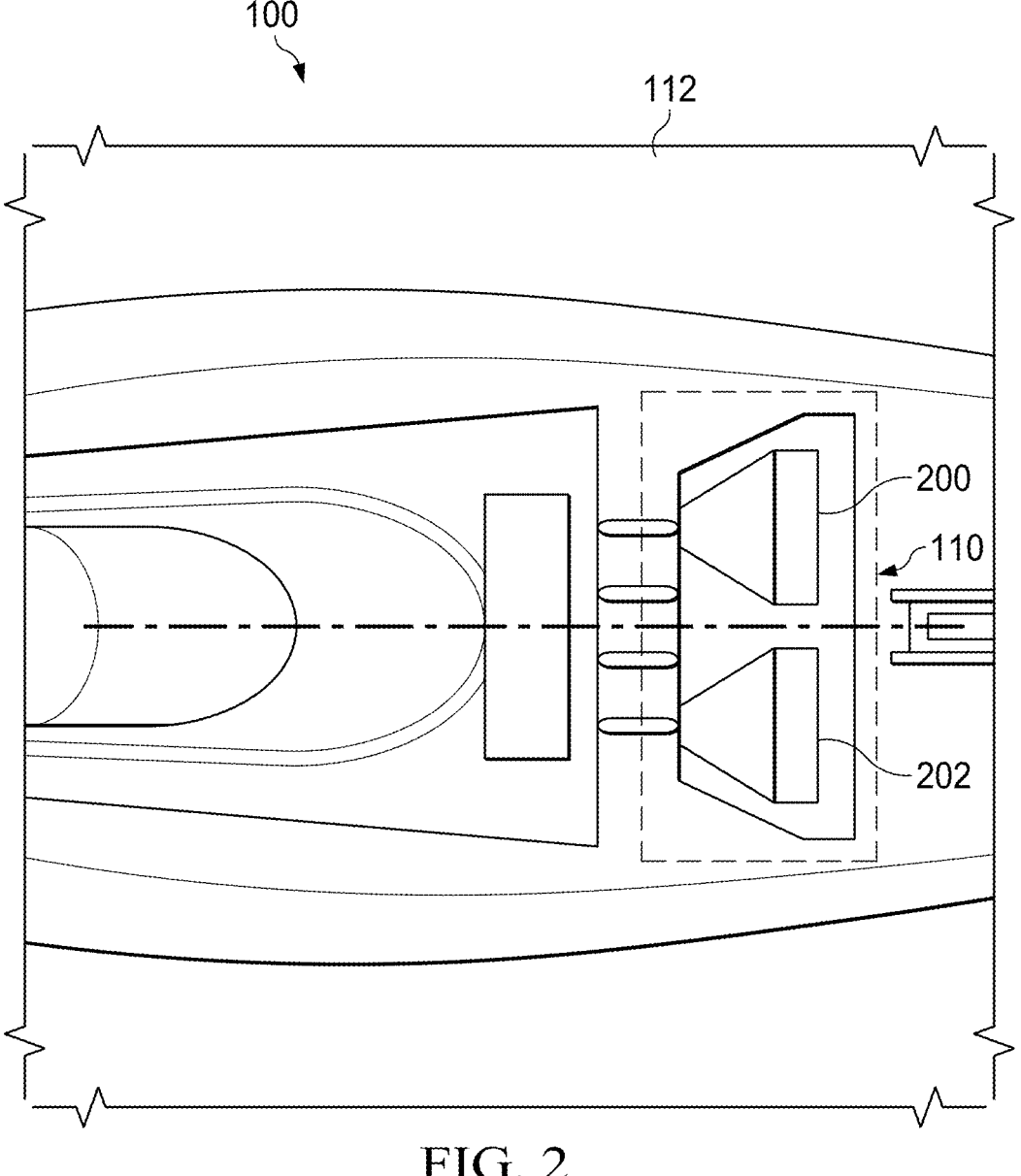
FIG. 2 is an illustration of a camera system on the bottom side of a tanker aircraft in accordance with an illustrative embodiment.

Turning next to FIG. 2, an illustration of camera system 110 on the bottom side of a tanker aircraft is depicted in accordance with an illustrative embodiment. In the illustrative examples, the same reference numeral may be used in more than one figure. This reuse of a reference numeral in different figures represents the same element in the different figures.

As depicted in this figure, a view of a portion of bottom side 112 of tanker aircraft 100 is shown. In this view, camera system 110 comprises camera 200 and camera 202.

In this illustrative example, the aerial refueling operator relies on the video stream generated by camera system 110 to observe the relative positions of boom 106 and a receiver aircraft. The aerial refueling operator uses these observations to control movement and positioning of boom 106.

In this example, a pair of patterns can be created and injected into video frames in the video stream as the video stream is displayed to the aerial refueling operator. The patterns are designed to be visible to the aerial refueling operator when the display of the video frames are not sequential or at a rate causing a single pattern to be displayed for a duration of multiple frames, making it visible. The pair of patterns are patterns selected that cancel each other when viewed in rapid succession by the aerial refueling operator during normal operation of camera system 110 in generating the video screen.

For example, the color of the video can be shifted towards the red on odd frames and towards green on even frames. The display of such frames to the aerial refueling operator are perceived as a neutral average of the red and green color shifts. With the relatively slow response of human color vision, the aerial refueling operator user would not detect the transient color shifts unless a single pattern is displayed for more than a given period of time.

If camera system 110 or any other portion of the video system that is generating and sending the video stream for display fails or has an inability to properly generate the video stream, the aerial refueling operator sees the pattern and can immediately inform the pilot in the receiver aircraft to move away from tanker aircraft 100.

Figure 3:
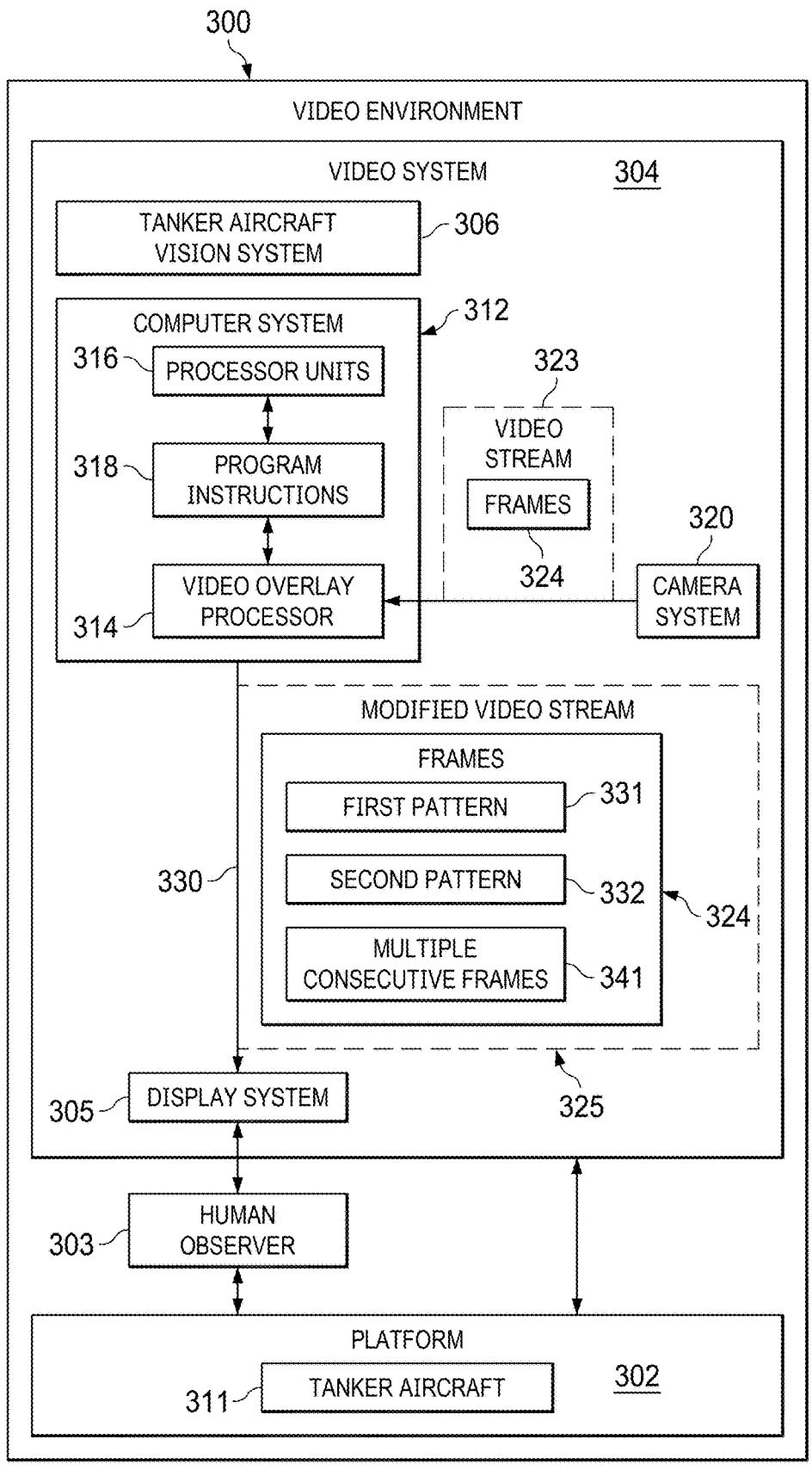
FIG. 3 is an illustration of a block diagram of a video environment in accordance with an illustrative embodiment.

With reference now to FIG. 3, an illustration of a block diagram of a video environment is depicted in accordance with an illustrative embodiment. In this illustrative example, video environment 300 is an environment in which human observer 303 can operate platform 302 using video system 304. In one illustrative example, human observer 303 relies on visualizations provided by video system 304 to operate platform 302. In other words, video system 304 can be used for applications in which human observer 303 uses a video feed such as modified video stream 325 in which interruptions or undesired changes to frames 324 are undesired.

Platform 302 can take a number of different forms. For example, platform 302 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a tanker aircraft, a surface ship, a tank, a personnel carrier, a train, a spacecraft, a space station, a satellite, a submarine, an automobile, a power plant, a bridge, a dam, a house, a manufacturing facility, a building, a robot, a robotic arm, a crane, and other suitable types of platforms.

When platform 302 is a tanker aircraft 311, video system 304 is tanker aircraft vision system 306 in this example. Tanker aircraft 100 in FIG. 1 is an example of an implementation for tanker aircraft 311.

In one illustrative example, video system 304 can be connected to platform 302. For example, video system 304, can be considered to be physically connected to platform 302, by at least one of being secured to the second component, bonded to the platform 302, mounted to the platform 302, welded to the second component, fastened to the platform 302, or connected to the platform 302 in some other suitable manner. The video system 304 also can be connected to the platform 302 using a third component. The video system 304 can also be considered to be physically connected to the second component by being formed as part of the platform 302, an extension of the platform 302, or both. In some examples, the video system 304 can be physically connected to the platform 302 by being located within the platform 302.

In another illustrative example, video system 304 may not be physically connected to platform 302. Instead, video system 304 can be positioned relative to platform 302 to provide the desired view for human observer 303 to operate platform 302.

In this example, video system 304 can operate to provide human observer 303 an indication as to whether an interruption to a video stream displayed by video system 304 has occurred.

Further in this example, video system 304 includes a number of different components. As depicted, video system 304 comprises camera system 320, display system 305, and video overlay processor 314.

In this illustrative example, camera system 320 is comprised of a number of cameras. As used herein, a "number of" when used with reference items means one or more items. For example, a number of cameras is one or more cameras. The number of cameras in camera system 320 operate to generate video stream 323.

In this depicted example, camera system 320 generates video stream 323 that provides a view used by human observer 303 to perform operations using platform 302. For example, platform 302 is tanker aircraft 311 and the video stream 323 can be a view of the relative positions between the tanker aircraft 311 and the receiver aircraft when human observer 303 is performing a refueling operation. As another example, if platform 302 is a crane, camera system 320 can generate video stream 323 that provides a view of the crane and an object being manipulated by the crane. As yet another example, when platform 302 is a surgical robot, the view can be of the surgical tool connected to the surgical robot and a patient in which an operation is being performed. These and other type of views can be generated based on the type of platform 302.

In this illustrative example, display system 305 is a physical hardware system and includes one or more display devices on which a video stream can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information to human observer 303.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Video overlay processor 314 can be implemented in software, hardware, firmware or a combination thereof. When software is used, the operations performed by video overlay processor 314 can be implemented in program instructions configured to run on hardware, such as a processor unit. When firmware is used, the operations performed by video overlay processor 314 can be implemented in program instructions and data and stored in persistent memory to run on a processor unit. When hardware is employed, the hardware can include circuits that operate to perform the operations in video overlay processor 314.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

When a number of processor units 316 is present, the number of processor units 316 can be located in computer system 312. Computer system 312 is a physical hardware system and includes one or more data processing systems. When more than one data processing system is present in computer system 312, those data processing systems are in communication with each other using a communications medium. The communications medium can be a network. The data processing systems can be selected from at least one of a computer, a server computer, a tablet computer, or some other suitable data processing system.

As depicted, computer system 312 includes a number of processor units 316 that are capable of executing program instructions 318 implementing processes in the illustrative examples. In other words, program instructions 318 are computer-readable program instructions.

These program instructions can be stored on a computer-readable storage media. A computer-readable storage media is a physical or tangible storage device used to store program instructions 318 rather than a medium that propagates or transmits program instructions 3118. The computer-readable storage media can be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

The computer-readable storage media, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device. The computer-readable storage media with the program instructions embodied therewith form a computer program product.

As used herein, a processor unit in the number of processor units 316 is a hardware device and is comprised of hardware circuits such as those on an integrated circuit that respond to and process instructions and program code that operate a computer. When the number of processor units 316 executes program instructions 318 for a process, the number of processor units 316 can be one or more processor units that are in the same computer or in different computers. In other words, the process can be distributed between processor units 316 on the same or different computers in computer system 312.

Further, the number of processor units 316 can be of the same type or different types of processor units. For example, the number of processor units 316 can be selected from at least one of a single core processor, a dual-core processor, a multi-processor core, a general-purpose central processing unit (CPU), a graphics processing unit (GPU), a digital signal processor (DSP), or some other type of processor unit.

In this example, video overlay processor 314 can be implemented in at least one of a graphics processing unit, a central processing unit, a digital signal processor, an application specific integrated circuit, a media processor, a video processing unit, a programmable logic device, a programmable logic array, a programmable array logic, a field-programmable logic array, a field-programmable gate array, or other suitable hardware circuit or device.

As depicted, video overlay processor 314 receives video stream 323 from camera system 320 in real time during operation of platform 302. In this illustrative example, "real time" means that the video stream 323 is sent from camera system 320 as quickly as possible without intentional delay. In these examples, real time can be the continuous and undisrupted communication of information by video stream 323. In this example, real time involves sending video stream 323 for display on display system 305 without delay that can cause human observer 303 to be unable to properly operate platform 302.

In this example, video overlay processor 314 overlays first pattern 331 and second pattern 332 on an alternating basis onto frames 324 in video stream 323 in real time to form modified video stream 325. In this illustrative example, "overlay" can be a spatially specific chromatic modification applied to an image. This modification is more like watermark rather than a separate layer on the image.

Video overlay processor 314 can display modified video stream 325 in real time on display system 305. First pattern 331 and second pattern 332 in frames 324 in modified video stream 325 are perceptually hidden on display system 305 in response to frames 324 in modified video stream 325 being displayed without interruption. In these examples, these two patterns are perceptually hidden on display system 305 in response to frames 324 in modified video stream 325 being displayed without interruption.

In this example, perceptually hidden on display system 305 means that these patterns are hidden from the view of human observer 303 viewing display system 305. In other words, human observer 303 cannot see or perceive the patterns in frames 324 when frames 324 are displayed on display system 305 without interruption.

First pattern 331 and second pattern 332 in frames 324 in modified video stream 325 are perceptually hidden from view of human observer 303 because of the relatively slow response time that the human visual system has to changes between first pattern 331 and second pattern 332. For example, these relatively slow response times to changes can be to changes in color between first pattern 331 and second pattern 332. With the rapid changes between these patterns, the human observer 303 does not see these patterns when viewing display system 305.

In this illustrative example, video overlay processor can alternately and repeatedly overlay first pattern 331 and second pattern 332 onto frames 324 sequentially to form modified video stream 325 in a number of locations. For example, the location is selected from a group comprising camera system 320, display system 305, a video capture adapter, a network switch, a network router, a server computer, a graphics card in display system 305, a display hardware in a display device in display system 305, and other suitable locations.

In this illustrative example, first pattern 331 and second pattern 332 are selected such that first pattern 331 and second pattern 332 cancel each other with respect to visibility by human observer 303 when displayed in succession to each other in frames 324 in modified video stream 325. Further in this example, first pattern 331 and second pattern 332 are selected such that one of first pattern 331 and second pattern 332 become visible when one of first pattern 331 and second pattern 332 is displayed for multiple consecutive frames 341 in frames 324 in modified video stream 325.

In this example, video overlay processor 314 sends modified video stream 325 to display system 305 over video path 330. In this example, video path 330 is the path from video overlay processor 314 to display system 305 and can include display system 305.

An interruption of modified video stream 325 along video path 330 causes at least one of first pattern 331 or second pattern 332 to be visible on display system 305. In other words, first pattern 331, second pattern 332, or both first pattern 331 and second pattern 332 become visible when the interruption occurs. The interruption is one that causes one of the patterns to be displayed consecutively rather than in an alternating manner with the other pattern. In one example, the interruption can be caused by a held frame or repeating frame.

Figure 4:
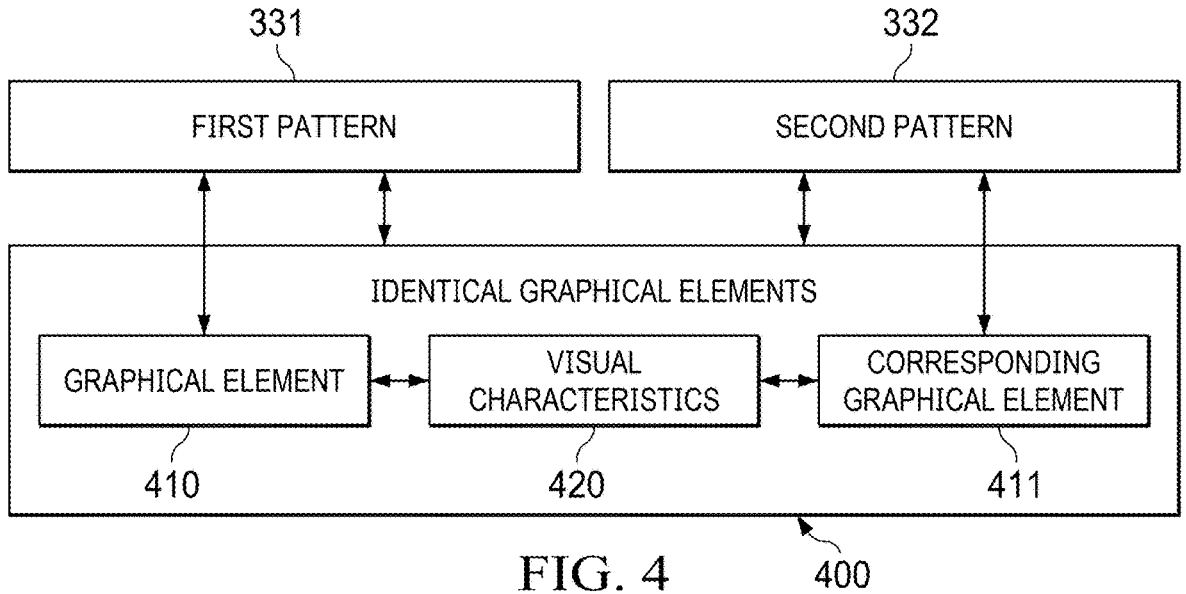
FIG. 4 is an illustration of a block diagram of a first pattern and a second pattern in accordance with an illustrative embodiment.

With reference next to FIG. 4, an illustration of a block diagram of a first pattern and a second pattern for overlay is depicted in accordance with an illustrative embodiment. In the illustrative examples, the same reference numeral may be used in more than one figure. This reuse of a reference numeral in different figures represents the same element in the different figures.

In this illustrative example, first pattern 331 and second pattern 332 overlaid onto frames 324 sequentially in alternating and repeating manner are comprised of identical graphical elements 400. In particular, graphic elements in first pattern 331 are identical to graphical elements in second pattern 332. In other words, corresponding graphical elements between the two patterns are the same. The shapes of the shape of graphical elements that correspond to each other in the two patterns are the same in this example.

For example, if graphical element 410 is the number "5," corresponding graphical element 411 is also the number "5." These two graphical elements correspond to each other because these two graphical elements are in the same location with respect to their location in the pattern such that these graphical elements displayed in the same location on display system 305 when displaying frames 324.

In this example, identical graphical elements 400 comprises a collection of pixels forming a spatial distribution with a spatial frequency distribution that is perceivable to a human observer. For example, identical graphical elements 400 can be selected from at least one of a geometric shape, a line, a curve, an icon, a symbol, text, a number, a string, a grid, or some other graphical element.

Additionally in this example, an identical graphical element has differences in visual characteristics 420 in identical graphical elements 400 between the first pattern 331 and second pattern 332 such that first pattern 331 and second pattern 332 cancel each other with respect to visibility by human observer 303 when displayed in succession to each other in frames 324 in the modified video stream 325. In this example, a first frame with first pattern 331 is displayed, a second frame with second pattern 332 is displayed, a third frame with first pattern 331 is displayed, and a fourth frame with second pattern 332 is displayed and so on with the pattern in frames 324 alternating between first pattern 331 and second pattern 332.

For example, graphical element 410 in first pattern 331 has a first set of visual characteristics 420 and corresponding graphical element 411 in second pattern 332 has a second set of visual characteristics 420. As used herein, a "set of" when used with reference items means one or more items. For example, a set of visual characteristics 420 is one or more of visual characteristics 420. In this illustrative example, visual characteristics 420 can be selected from at least one of a color, a brightness, or some other visual characteristic that can be selected to cause the display of first pattern 331 and second pattern 332 to be imperceptible.

In the illustrative example, one or more of visual characteristics 420 for first pattern 331 and second pattern 332 can be selected with a range of values that enable causing the display of these patterns to be imperceptible when first pattern 331 and second pattern 332 are displayed in an alternating manner.

In these examples, the luminance of content in frames 324 is maintained while visual characteristics such as color has the polarity shifted between frames in these patterns such that the colors complement each other.

For example, graphical element 410 in first pattern 331 has first set of visual characteristics 420 and corresponding graphical element 411 in second pattern 332 has a second set of visual characteristics 420. The first set of visual characteristics 400 has an opposite polarity from the second set of visual characteristics 420 such that graphical element 410 and corresponding graphical element 411 are perceptually hidden on display system 305 to human observer 303 viewing display system 305 when frames 324 with graphical elements in the modified video stream 325 are displayed on display system 305. In this example, polarity is a pair of color shifts between patterns that visually complement each other. Examples are red/green and blue/yellow.

In the illustrative example, polarity refers to the selection of visual characteristics 420 within frames 324 in modified video stream 325. With respect to an opposite polarity, visual characteristics 420 for graphical elements in first pattern 331 are selected to have values that are opposite to the values for the graphical elements in second pattern 332. In other words, the net effect in the change of color between first pattern 331 and second pattern 332 is zero.

For example, with color as a visual characteristic, graphical element 410 can be red while corresponding graphical element 411 is green. The results of displaying these corresponding graphical elements in an alternating manner in frames 324 results in these two graphical elements being perceptually hidden from view to human observer 303.

For example, the selection of the colors for these patterns results in the patterns being perceptually hidden from the view of human observer 303. This occurs through the relatively slow response of the human visual system for human observer 303 to color.

The section of colors such as red and green for first pattern 331 and second pattern 332, respectively, results in changes that occur so quickly that the human vision system averages it out and does not perceive the patterns.

When this rapid changing of color (polarity), is disrupted because an interruption of modified video stream 325 results in a pattern being displayed more than one time rather than in an alternating manner. The interruption can also occur when the alternating display slows down from the desired frame rate. As a result, the vision system of human observer 303 has sufficient time to recognize the change and the color becomes apparent in the display viewed by human observer 303. Although in this example, the discussion is of an interruption such that the pattern is displayed two times in a row rather than in an alternating manner, the pattern could be displayed 3, 10, or other numbers of times making the visibility of at least one of first pattern 331 or second pattern 332 visible for a longer period of time to human observer 303.

As another example, when the visual characteristic is brightness, graphical element 410 can have a high brightness such as 94% while corresponding graphical element 411 has a low brightness such as 5%. With this example, brightness cancellation can occur resulting in graphical element 410 and corresponding graphical element 411 being perceptually hidden from view on display system 305 to human observer 303.

As a result, human observer 303 can realize that modified video stream 325 has been interrupted such that the view provided by camera system 320 may no longer be in real-time or accurate. As a result, human observer 303 can take actions based on this disruption.

For example, human observer 303 can abort a refueling operation with a receiver aircraft when platform 302 is tanker aircraft 311. Human observer 303 can inform the pilot of the receiver aircraft to move away from tanker aircraft 311 to avoid an unintended contact with the boom. In another illustrative example, platform 302 can be a surgical platform including a robotic arm and a camera system operated by a surgeon. In yet another illustrative example, platform 302 can be a factory including an assembly line and a camera system in which the camera system provides for security monitoring.

Further in another illustrative example, the extent for first pattern 331 and second pattern 332 can be selected to avoid saturation that causes clipping in frames 324 in modified video stream 325. In this example, the extent is the coverage of these patterns. In other words, extent can be spatial coverage or the area occupied by the patterns.

In yet another example, color values for color can be selected for first pattern 331 and second pattern 332 to avoid saturation that causes clipping in frames 324 in modified video stream 325. For example, video stream 323 can contain very bright content such as having a brightness from zero to 99 or very dark content such as having brightness of 15. Adding first pattern 331 and second pattern 332 to the image can result in driving very bright portions in frames 324 beyond saturation resulting in clipping.

This clipping can throw off the color balance of the clip portions. In these examples clipping can lead to visual artifacts for distortion when displaying modified video stream 325 on display system 305. Clipping can result in loss of information and dynamic range in the displayed image.

This situation can be avoided by adjusting the magnitude of the chromaticity shift applied to a given pixel as a function of the brightness of the pixel being modified. For example, the chromatic modulation depth should taper off for very dark or very bright pixels, and should be not applied for zero value or maximum value pixels.

The illustration of video environment 300 in the different components in FIG. 3 and FIG. 4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, camera system 320 is shown as a component within the video system 304. In other illustrative examples, camera system 320 can be considered a separate component from video system 304. Further, video system 304 can include other components such as an input device in a human machine interface.

In yet another illustrative example, one or more video overlay processors in addition to video overlay processor 314 can be present in video system 304. These additional video overlay processors can be in other locations in the path between camera system 320 and display system 305. Additionally, these video overlay processors can be used with other video display systems that may be present for platform 302. These video overlay processors can overlay different patterns in addition to or in place of first pattern 331 and second pattern 332 in an alternating manner.

Next, FIGS. 5-10 are examples of the first and second patterns with identical graphical elements in accordance with an illustrative embodiment. These patterns are examples of implementations for first pattern 331 and second pattern 332 in FIG. 3 and FIG. 4.

Figure 5:
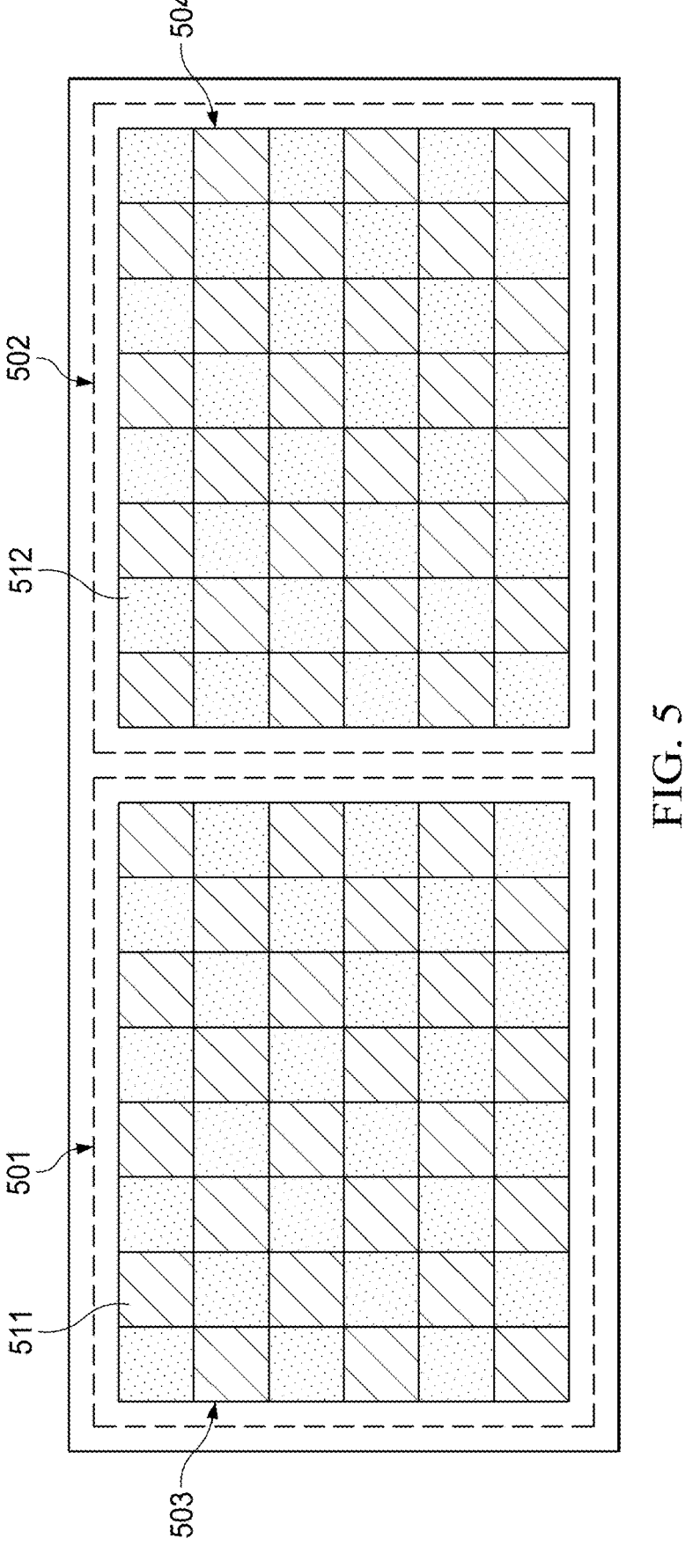
FIG. 5 is an illustration of a first pattern and second pattern in accordance with an illustrative embodiment.

With reference first to FIG. 5, an illustration of a first pattern and second pattern is depicted in accordance with an illustrative embodiment. In this example, first pattern 501 is an example of first pattern 331 in FIG. 3 and FIG. 4 and second pattern 502 is an example of second pattern 332 in FIG. 3 and FIG. 4.

As depicted, first pattern 501 is comprised of graphical elements 503. Second pattern 502 is comprised of graphical elements 504. These two patterns have the same dimensions with the graphical elements being identical graphical elements. Further in this example, by having identical graphical elements, each pattern has the same number of graphical elements as the other pattern with the same arrangement of graphical elements in this example. This arrangement includes orientation and location of graphical elements. In this example, graphical elements 503 and graphical elements 504 comprise squares.

In this illustrative example, these graphical elements have opposite polarities for a visual characteristic in the form of color. For example, graphical element 511 in graphical elements 503 is a square having a first color while corresponding graphical element 512 in graphical elements 504 is also a square having a second color that has an opposite polarity to the first color.

Corresponding graphical element 512 corresponds to graphical element 511 because corresponding graphical element 512 is in the same position in second pattern 502 as graphical element 511 in first pattern 501. In this example, the colors can be selected to have opposite polarities such as the first color being red and the second color being green.

Figure 6:
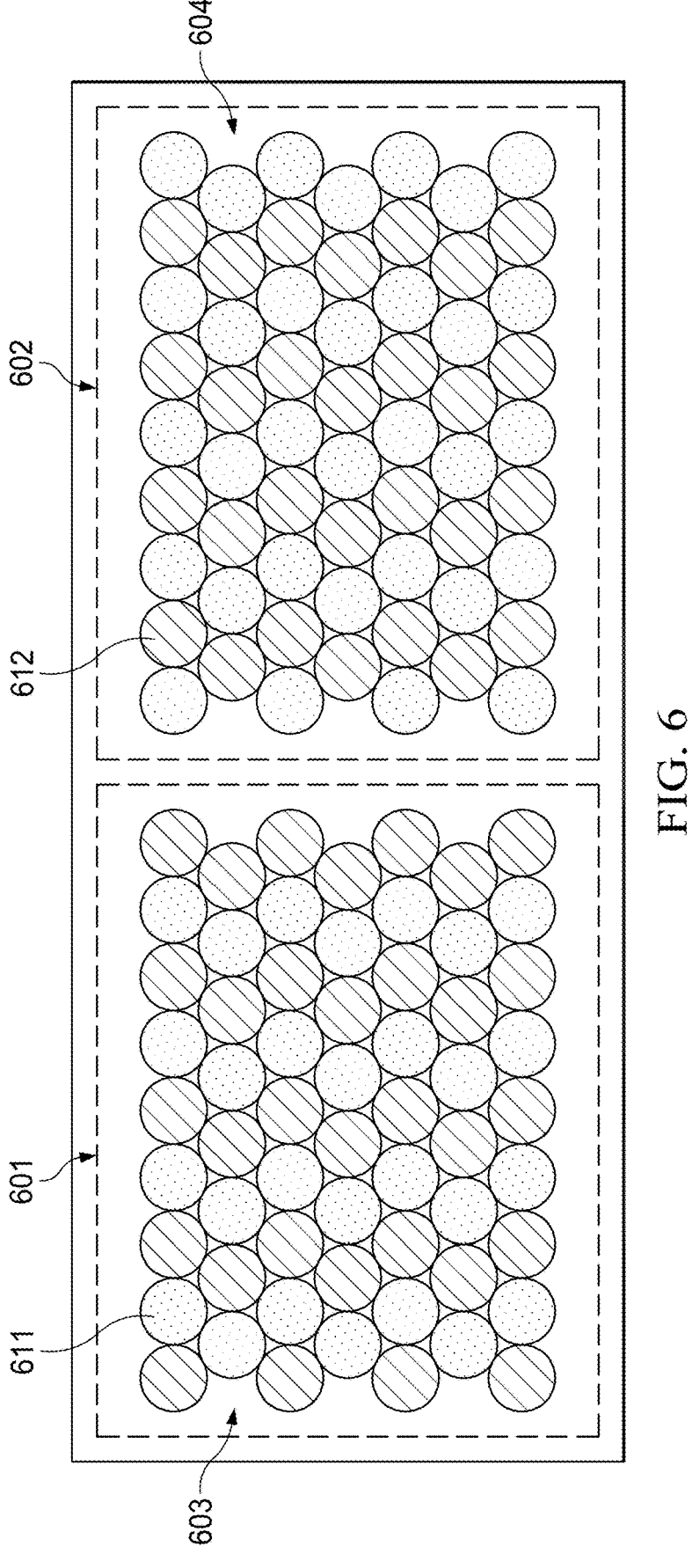
FIG. 6 is another illustration of a first pattern and second pattern in accordance with an illustrative embodiment.

With reference next to FIG. 6, another illustration of a first pattern and second pattern is depicted in accordance with an illustrative embodiment. In this example, first pattern 601 is an example of first pattern 331 in FIG. 3 and FIG. 4 and second pattern 602 is an example of second pattern 332 in FIG. 3 and FIG. 4.

In this illustrative example, first pattern 601 is comprised of graphical elements 603. Second pattern 602 is comprised of graphical elements 604. These two patterns have the same dimensions with the graphical elements being identical graphical elements. In this particular example, graphical elements 603 and graphical elements 604 comprise circles.

These graphical elements have opposite polarities for a visual characteristic in the form of color. For example, graphical element 611 is a circle with a first color while corresponding graphical element 612 is a circle with a second color that has an opposite polarity to the first color. In this example, the colors can be selected to have opposite polarities such as the first color being red and the second color being green.

Figure 7:
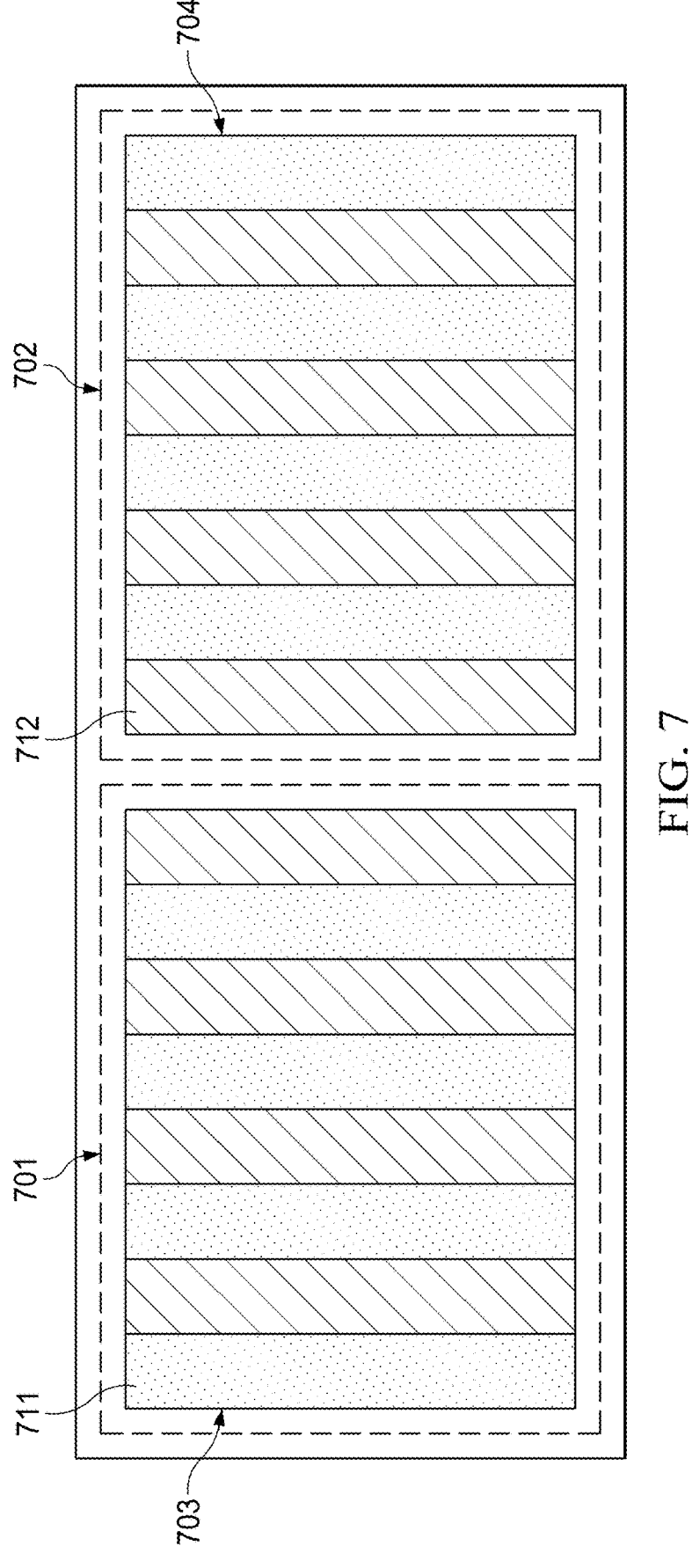
FIG. 7 is yet another illustration of a first pattern and a second pattern in accordance with an illustrative embodiment.

Turning to FIG. 7, yet another illustration of a first pattern and a second pattern is depicted in accordance with an illustrative embodiment. In this example, first pattern 701 is an example of first pattern 331 in FIG. 3 and FIG. 4 and second pattern 702 is an example of second pattern 332 in FIG. 3 and FIG. 4.

In this illustrative example, first pattern 701 is comprised of graphical elements 703. Second pattern 702 is comprised of graphical elements 704. These two patterns have the same dimensions with the graphical elements being identical graphical elements. In this example, graphical elements 703 and graphical elements 704 comprise bars.

These illustrated graphical elements have opposite polarities for a visual characteristic in the form of color. For example, graphical element 711 is a bar with a first color while corresponding graphical element 712 is a bar with a second color that has an opposite polarity to the first color. In this example, the colors can be selected to have opposite polarities such as the first color being blue and the second color being yellow.

Figure 8:
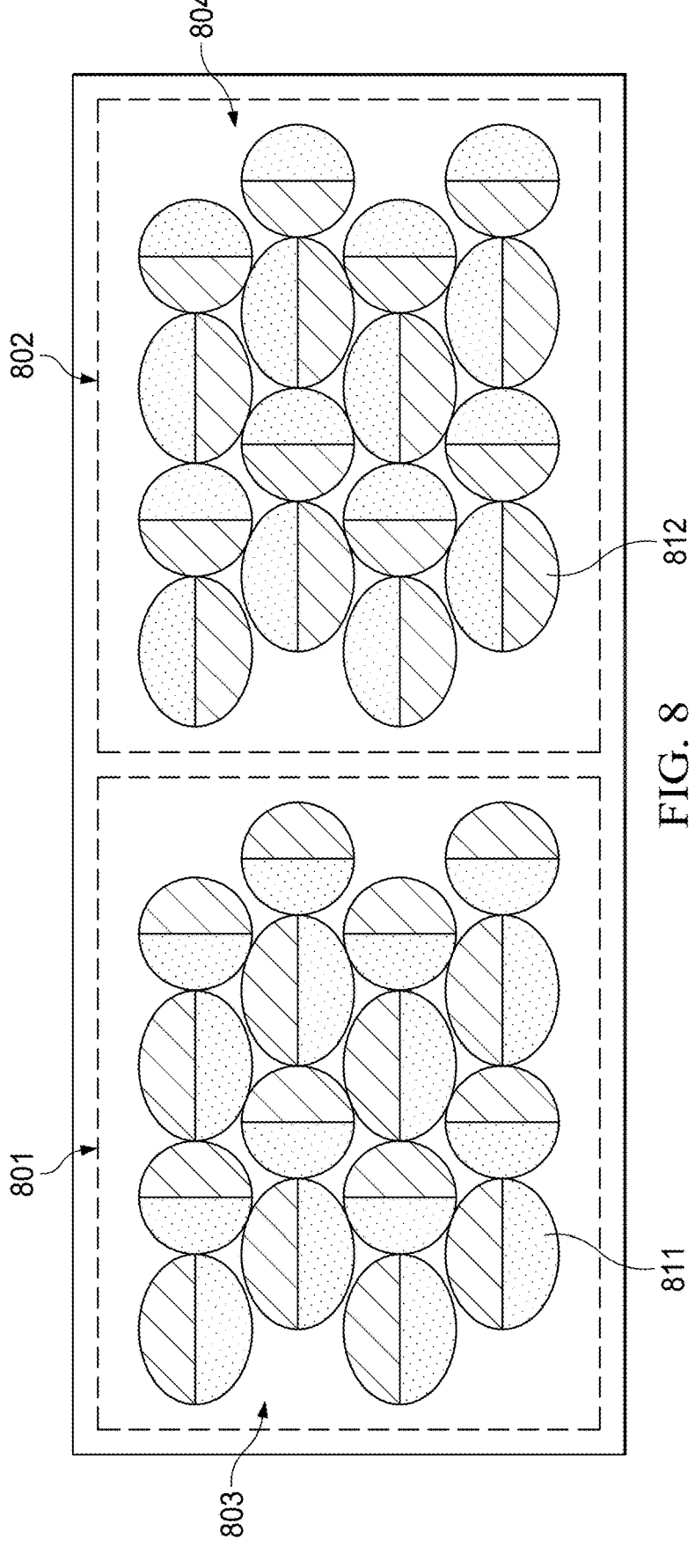
FIG. 8 is an illustration of a first pattern and second pattern in accordance with an illustrative embodiment.

Next in FIG. 8, an illustration of a first pattern and second pattern is depicted in accordance with an illustrative embodiment. In this example, first pattern 801 is an example of first pattern 331 in FIG. 3 and FIG. 4 and second pattern 802 is an example of second pattern 332 in FIG. 3 and FIG. 4.

As depicted, first pattern 801 is comprised of graphical elements 803. Second pattern 802 is comprised of graphical elements 804. These two patterns have the same dimensions with the graphical elements being identical graphical elements also having the same dimensions in this example. As depicted, graphical elements 803 and graphical elements 804 comprise semicircles.

These graphical elements have opposite polarities for a visual characteristic in the form of color. For example, graphical element 811 is a semicircle with a first color while corresponding graphical element 812 is a semicircle with a second color that has an opposite polarity to the first color. In this example, the colors can be selected to have opposite polarities such as the first color being blue and the second color being yellow.

Figure 9:
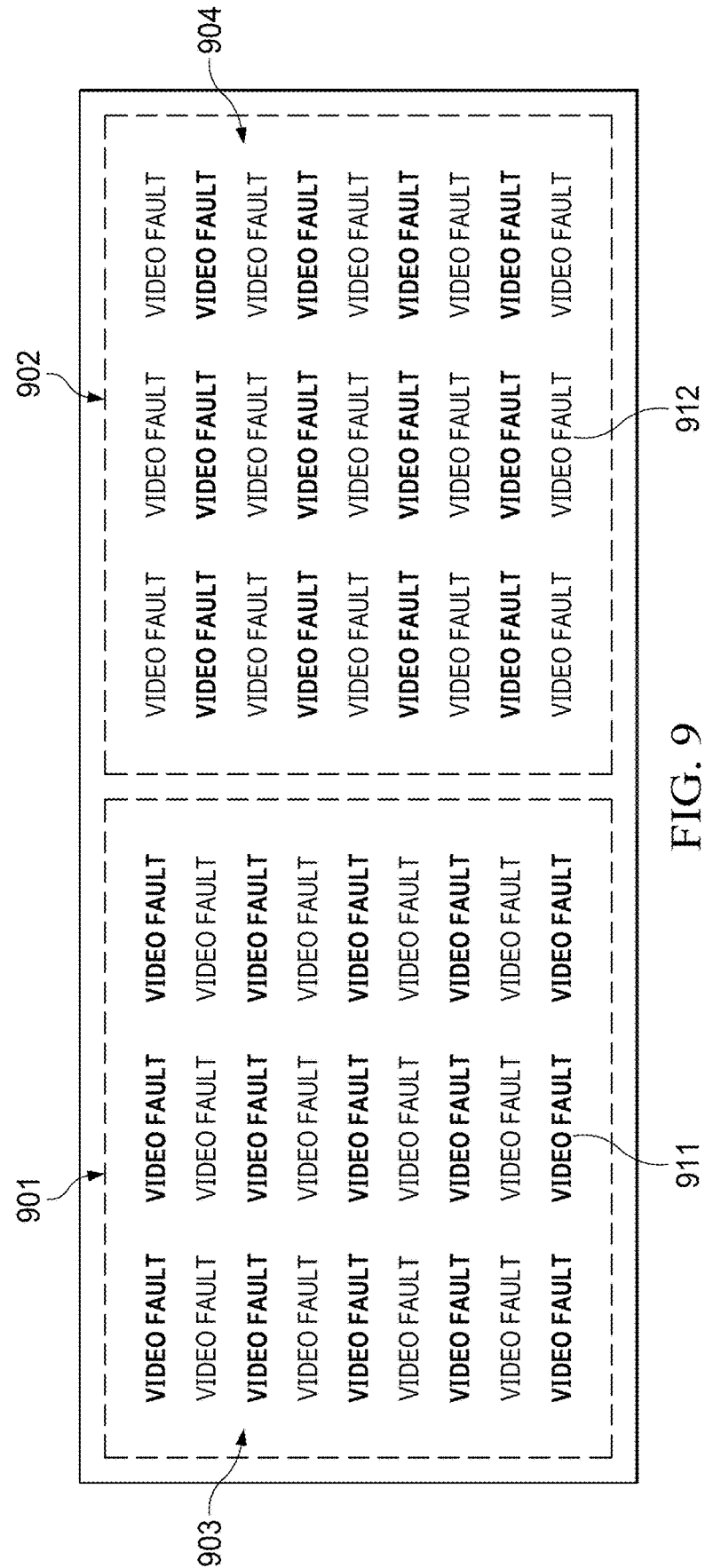
FIG. 9 is another illustration of a first pattern and second pattern in accordance with an illustrative embodiment.

Turning to FIG. 9, another illustration of a first pattern and second pattern is depicted in accordance with an illustrative embodiment. In this example, first pattern 901 is an example of first pattern 331 in FIG. 3 and FIG. 4 and second pattern 902 is an example of second pattern 332 in FIG. 3 and FIG. 4.

As shown in this example, first pattern 901 is comprised of graphical elements 903. Second pattern 902 is comprised of graphical elements 904. These two patterns have the same dimensions with the graphical elements being identical graphical elements. In this depicted example, graphical elements 903 and graphical elements 904 are implemented using a string. In this example, the strings is "video fault."

These graphical elements have opposite polarities for a visual characteristic in the form of color. For example, graphical element 911 is the string with a first color while corresponding graphical element 912 is the string with a second color that has an opposite polarity to the first color. In this example, the colors can be selected to have opposite polarities such as the first color being red and the second color being green.

Figure 10:
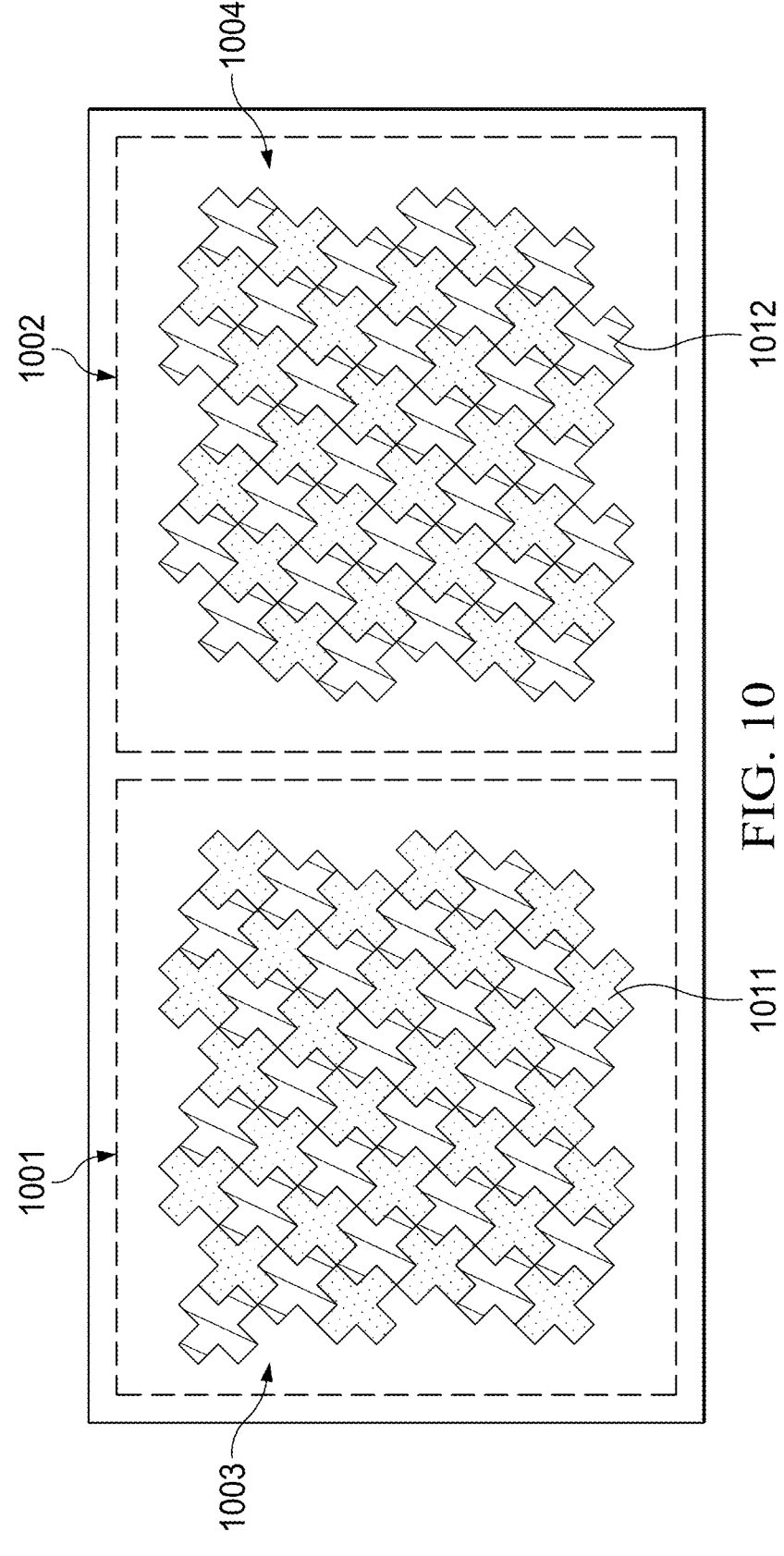
FIG. 10 is an illustration of a first pattern and second pattern in accordance with an illustrative embodiment.

With reference to FIG. 10, an illustration of a first pattern and second pattern is depicted in accordance with an illustrative embodiment. In this example, first pattern 1001 is an example of first pattern 331 in FIG. 3 and FIG. 4 and second pattern 1002 is an example of second pattern 332 in FIG. 3 and FIG. 4.

As depicted, first pattern 1001 is comprised of graphical elements 1003. Second pattern 1002 is comprised of graphical elements 1004. These two patterns have the same dimensions with the graphical elements being identical graphical elements. In this example, graphical elements 1003 and graphical elements 1004 have an X shape.

These graphical elements have opposite polarities for a visual characteristic in the form of brightness. For example, graphical element 1011 is the X shape with a first brightness while corresponding graphical element 1012 is the X shape with a second brightness that has an opposite polarity to the first brightness. In this example, the brightness for graphical element 1011 and the brightness for corresponding graphical element 1012 are selected to have opposite polarities. In this example, brightness is luminance of the image of the elements. This type of polarity can be used with high frame rates.

The illustration of the first and second patterns in FIGS. 5-10 are shown as some implementations for first pattern 331 and second pattern 332 and not meant to limit the manner in which other first and second patterns can be implemented. For example, the graphical elements can have more than one shape in these patterns. With this example, a first pattern can include bars and circles. The second pattern also includes bars in circles such that the bars in circles correspond to each other in these patterns.

In another illustrative example, multiple types of graphical elements can be used as identical graphical elements. For example, a first pattern and second pattern can be comprised of identical graphical elements in the form of rectangles and squares. These rectangles and squares can be located in positions such that each rectangle in a first pattern has a corresponding rectangle and second pattern and each square in the first pattern can have a corresponding square in the second pattern.

Figure 11:
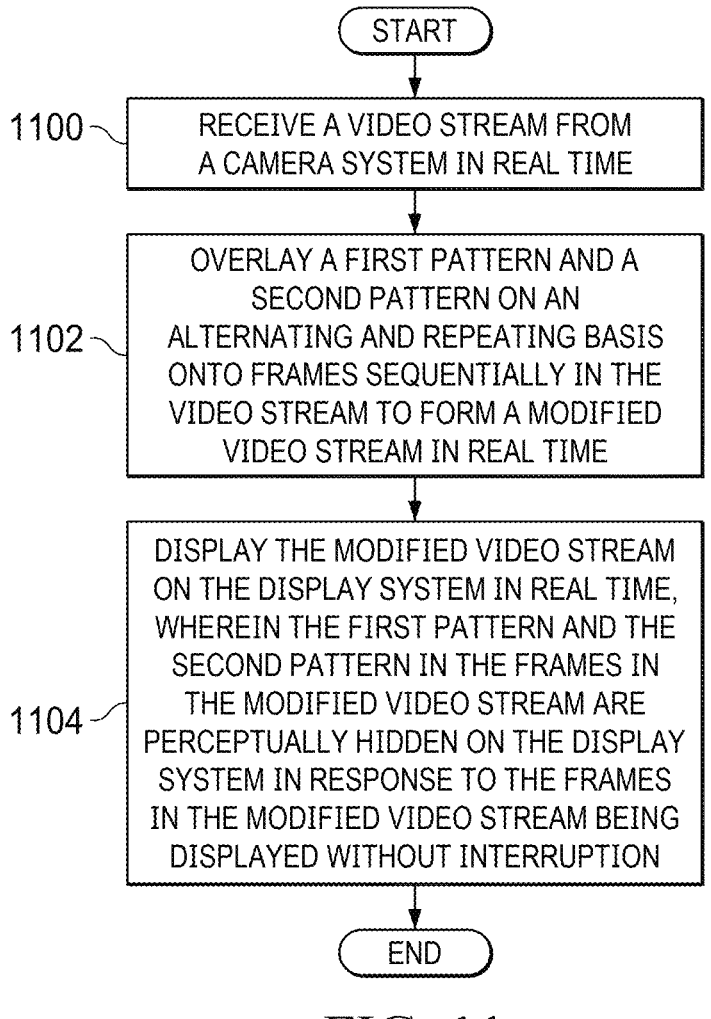
FIG. 11 is an illustration of a flowchart of a process for displaying a video stream in accordance with an illustrative embodiment.

Turning next to FIG. 11, an illustration of a flowchart of a process for displaying a video stream is depicted in accordance with an illustrative embodiment. The process in FIG. 11 can be implemented in hardware, software, or both. When implemented in software, the process can take the form of program instructions that are run by one of more processor units located in one or more hardware devices in one or more computer systems. For example, the process can be implemented in video overlay processor 314 in computer system 312 in FIG. 2.

The process begins by receiving a video stream from a camera system in real time (operation 1100). The process overlays a first pattern and a second pattern on an alternating and repeating basis onto frames sequentially in the video stream sequentially to form a modified video stream in real time (operation 1102).

The process displays the modified video stream on the display system in real time, wherein the first pattern and the second pattern in the frames in the modified video stream are perceptually hidden on the display system in response to the frames in the modified video stream being displayed without interruption (operation 1104). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figures 12, 13:
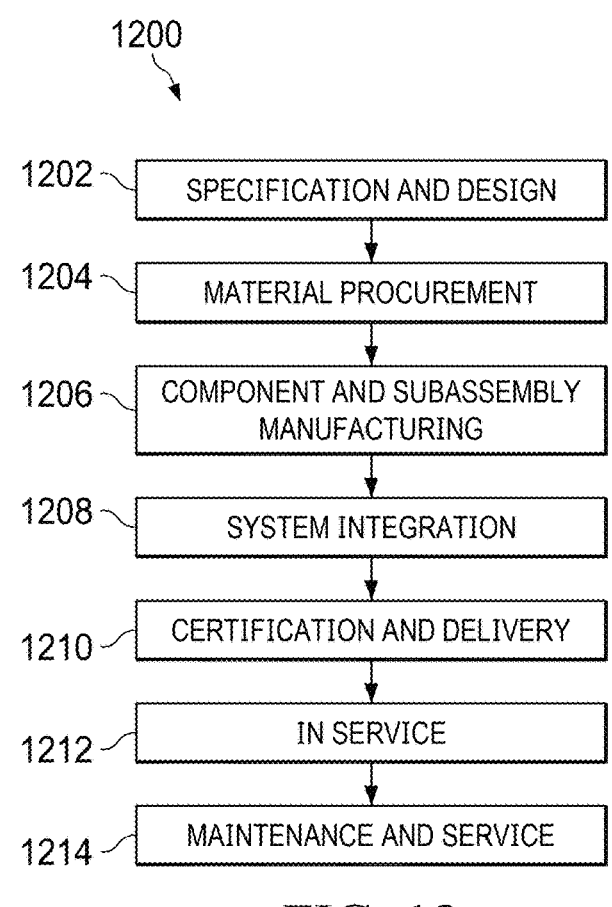
FIG. 12 is an illustration of an aircraft manufacturing and service method in accordance with an illustrative embodiment.
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 can go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 can be fabricated or manufactured in a manner similar to components or subassemblies produced while aircraft 1300 is in service 1212 in FIG. 12. As yet another example, one or more apparatus embodiments, method embodiments, or a combination thereof can be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both. The use of a number of the different illustrative embodiments may substantially expedite the assembly of aircraft 1300, reduce the cost of aircraft 1300, or both expedite the assembly of aircraft 1300 and reduce the cost of aircraft 1300.

For example, video system 304 can be implemented in aircraft 1300 during component and subassembly manufacturing 1206. Additionally, video system 304 can also be implemented in aircraft 1300 during maintenance and service 1214. This maintenance and service can include modification, reconfiguration, refurbishment, and other maintenance or service.

Thus, the illustrative examples provide a method, apparatus, and system for displaying a video stream generated by a camera system. In one illustrative example, A video system comprises a video overlay processor. The video overlay processor is configured to receive a video stream from a camera system in real time during operation of a platform. The video overlay processor is configured to overlay a first pattern and a second pattern on an alternating and repeating basis onto frames sequentially in the video stream in real time to form a modified video stream. The video overlay processor is configured to display the modified video stream in real time on a display system, wherein the first pattern and the second pattern in the frames in the modified video stream are perceptually hidden on the display system in response to the frames in the modified video stream being displayed without interruption.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A tanker aircraft vision system that comprises:
a camera system on a tanker aircraft configured to generate a video stream of relative positions between a boom and a receiver aircraft;
a display system in the tanker aircraft;
a video overlay processor in the tanker aircraft, wherein the video overlay processor is configured to:
receive the video stream from the camera system in real time during operation of the tanker aircraft;
overlay a first pattern and a second pattern on an alternating and repeating basis onto frames sequentially in the video stream in real time to form a modified video stream in a location selected from a group comprising the camera system, the display system, a video capture adapter, a network switch, a network router, a server computer, a graphics card in the display system, and a display hardware in a display device in the display system; and
display the modified video stream in real time on the display system, wherein the first pattern and the second pattern in the frames in the modified video stream are hidden on the display system in response to the frames in the modified video stream being displayed without interruption.

2. The tanker aircraft vision system of claim 1, wherein the first pattern and the second pattern are selected such that one of the first pattern and the second pattern become visible when one of the first pattern and the second pattern is displayed for multiple consecutive frames in the video stream.

3. The tanker aircraft vision system of claim 1, wherein the first pattern and the second pattern are selected such that the first pattern and the second pattern cancel each other with respect to visibility when displayed in succession to each other in the frames in the modified video stream.

4. The tanker aircraft vision system of claim 1, wherein the first pattern and the second pattern have identical graphical elements comprising a collection of pixels forming a spatial distribution with a spatial frequency distribution is perceivable to a human observer.

5. The tanker aircraft vision system of claim 1, wherein the first pattern and the second pattern are comprised of identical graphical elements with differences in visual characteristics in the identical graphical elements between the first pattern and the second pattern such that the first pattern and the second pattern cancel each other with respect to visibility by a human observer when displayed in succession to each other in the frames in the modified video stream.

6. The tanker aircraft vision system of claim 5, wherein the visual characteristics comprise a brightness.

7. The tanker aircraft vision system of claim 1, wherein a graphical element in the first pattern has a first set of visual characteristics and a corresponding graphical element in the second pattern has a second set of visual characteristics, wherein the first set of visual characteristics has an opposite polarity from the second set of visual characteristics such that the graphical element and the corresponding graphical element are perceptually hidden on the display system when the frames with graphical elements in the modified video stream are displayed on the display system.

8. The tanker aircraft vision system of claim 1, wherein an extent of the first pattern in the second pattern in the frames is selected to avoid saturation that causes clipping in the frames in the modified video stream.

9. The tanker aircraft vision system of claim 1, wherein color values for the first pattern in the second pattern in the frames are selected to avoid saturation that causes clipping in the frames in the modified video stream.

10. The tanker aircraft vision system of claim 5, wherein the visual characteristics comprise a color.

11. The tanker aircraft vision system of claim 1, wherein the video overlay processor is selected from at least one a graphics processing unit, a central processing unit, a digital signal processor, an application specific integrated circuit, a media processor, a video processing unit, a programmable logic device, programmable logic array, a programmable array logic, a field-programmable logic array, or a field-programmable gate array.

12. A video system that comprises a video overlay processor configured to:
   receive a video stream from a camera system in real time during operation of a platform;
   overlay a first pattern and a second pattern on an alternating and repeating basis onto frames sequentially in the video stream in real time to form a modified video stream, wherein a graphical element in the first pattern has a first set of visual characteristics and a corresponding graphical element in the second pattern has a second set of visual characteristics, wherein the first set of visual characteristics has an opposite polarity from the second set of visual characteristics such that the graphical element and the corresponding graphical element are perceptually hidden on a display system when the frames with graphical elements in the modified video stream are displayed on the display system; and
   display the modified video stream in real time on the display system, wherein the first pattern and the second pattern in the frames in the modified video stream are perceptually hidden on the display system in response to the frames in the modified video stream being displayed without interruption.

13. The video system of claim 12, wherein the first pattern and the second pattern are selected such that one of the first pattern and the second pattern become visible when one of the first pattern and the second pattern is displayed for multiple consecutive frames in the modified video stream.

14. The video system of claim 12, wherein the first pattern and the second pattern are selected such that the first pattern and the second pattern cancel each other with respect to visibility by a human observer when displayed in succession to each other in the frames in the modified video stream.

15. The video system of claim 12, wherein the first pattern and the second pattern are comprised of identical graphical elements with differences in visual characteristics between the identical graphical elements between the first pattern and the second pattern such that the first pattern and the second pattern cancel each other with respect to visibility by a human observer when displayed in succession to each other in the frames in the modified video stream.

16. The video system of claim 15, wherein the visual characteristics comprise a brightness.

17. The video system of claim 12, wherein the first pattern and the second pattern have identical graphical elements comprising a collection of pixels forming a spatial distribution with a spatial frequency distribution is perceivable to a human observer.

18. The video system of claim 15, wherein the visual characteristics comprise a color.

19. The video system of claim 12, wherein the platform is selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a tanker aircraft, a surface ship, a tank, a personnel carrier, a train, a spacecraft, a space station, a satellite, a submarine, an automobile, a power plant, a bridge, a dam, a house, a manufacturing facility, a building, a robot, a robotic arm, and a crane.

20. A computer implemented method for displaying a video stream, the method comprising:
   receiving, by a computer system, the video stream from a camera system in real time;
   overlaying, by the computer system, a first pattern and a second pattern on an alternating and repeating basis onto frames sequentially in the video stream in real time to form a modified video stream, wherein a graphical element in the first pattern has a first set of visual characteristics and a corresponding graphical element in the second pattern has a second set of visual characteristics, wherein the first set of visual characteristics has an opposite polarity from the second set of visual characteristics such that the graphical element and the corresponding graphical element are perceptually hidden on a display system when the frames with graphical elements in the modified video stream are displayed on the display system; and displaying, by the computer system, the modified video stream on the display system in real time, wherein the first pattern and the second pattern in the frames in the modified video stream are perceptually hidden on the display system in response to the frames in the modified video stream being displayed without interruption.

21. The computer implemented method of claim 20, wherein the first pattern and the second pattern are selected such that one of the first pattern and the second pattern become visible when one of the first pattern and the second pattern is displayed for multiple consecutive frames in the modified video stream.

22. The computer implemented method of claim 20, wherein the first pattern and the second pattern are selected such that the first pattern and the second pattern cancel each other with respect to visibility by a human observer when displayed in succession to each other in the frames in the modified video stream.

23. The computer implemented method of claim 20, wherein the first set of visual characteristics and the second set of visual characteristics comprise a color.

24. The computer implemented method of claim 20, wherein the first set of visual characteristics and the second set of visual characteristics comprise a brightness.

25. A computer program product for displaying a video stream, wherein the computer program product comprises a computer-readable storage media that comprises program instructions configured to cause a computer system to:

receive the video stream from a camera system in real time;

overlay a first pattern and a second pattern on an alternating and repeating basis onto frames sequentially in the video stream in real time to form a modified video stream in a location selected from a group comprising the camera system, a display system, a video capture adapter, a network switch, a network router, a server computer, a graphics card in a display system, and a display hardware in a display device in the display system; and display the modified video stream on the display system in real time, wherein the first pattern and the second pattern in the frames in the modified video stream are perceptually hidden on the display system in response to the frames in the modified video stream being displayed without interruption.

* * * * *